(No Model.)
R. C. WHAYNE.
ASH CHUTE.
No. 500,173. Patented June 27, 1893.
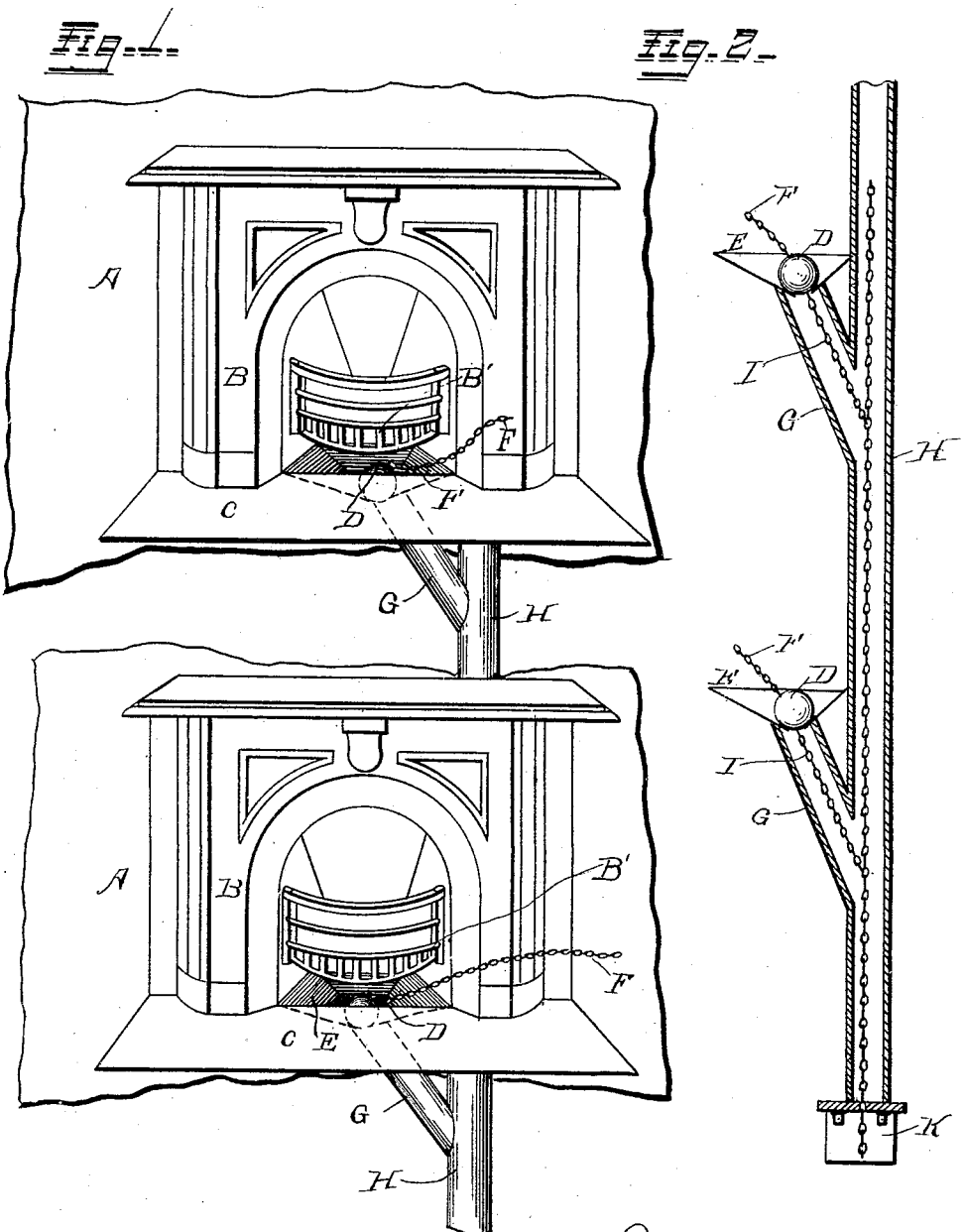
Witnesses:
W. J. Koerth
Aly. Scott
Robert C. Whayne
Inventor:-
By Chas. E. Barber,
Attorney.

UNITED STATES PATENT OFFICE.

ROBERT C. WHAYNE, OF LOUISVILLE, KENTUCKY.

ASH-CHUTE.

SPECIFICATION forming part of Letters Patent No. 500,173, dated June 27, 1893.

Application filed January 9, 1892. Serial No. 417,573. (No model.)

*To all whom it may concern:*

Be it known that I, ROBERT C. WHAYNE, a citizen of the United States, residing in Louisville, county of Jefferson, State of Kentucky, have invented a new and useful Ash-Chute, of which the following is a specification.

The objects of my invention are, first, to carry the ashes direct from each grate to the cellar without taking them up, or raising any dust, second, to keep the flues from clogging up by means of a steel chain working from each grate to the trap door below in the cellar; third, to prevent the draft from puffing the ashes back into the room by closing the trap door in the cellar when the mouth of the chute is open. I obtain these points by mechanism illustrated in the accompanying drawings, in which—

Figure 1 represents two grates, mantels, one above the other as they would naturally be placed in a two story house, and the ash hoppers in an operative position beneath the grates. Fig. 2 represents a chute and hopper in section with ball and chain attached, also, the trap door.

In Fig. 1 letter A represents the wall of the building; letter B represents the mantel and B' the grate; C the hearth; D the round cast iron ball, which is made one size larger than the mouth of the hopper, so that it cannot get into the flue. The ball being spherical will fall naturally close to the mouth of the arm and will always fit. Again, by reason of its shape, ashes will readily fall from it and will not clog as would be the case with a flat door or closing device. E is the hopper for the ashes, made funnel shape, extending downward, and at the bottom is one size smaller than the ball; F is a chain attached to the top of the ball, and fastened at any convenient place near the mantel, and is used for raising the ball from its place when I wish to empty the hopper; G is the arm of the chute from the main pipe and connected to the hopder beneath the grate.

Fig. 2 represents the chute complete as built in the wall when the house is being constructed. H is the main chute from the cellar to the top grate; I is the connecting chain from the lower part of the ball to the main chain; J is the main chain, which is connected to the trap door in the cellar, and extends through the main chute to the top; K is the trap door at the lower end of the chute in the cellar, which is hung on hinges, and is attached to the main chain. This door is always open when the chute is not being used. The chain which operates the door, K, is so long as to permit the door, K, to drop open when the balls in the fire places are seated, and, when one of the balls is raised the door, K, will be simultaneously closed, thus preventing draft from below to cause the ashes to enter the room in the house. The chains moving in and through the chute will keep it clear and prevent clogging.

What I claim as my invention, and desire to secure by Letters Patent, is—

1. A main chute having an arm provided with a hopper and a ball adapted to close the opening in the hopper; in combination with a chain which is secured to the ball above the hopper and a second chain secured to the lower side of the ball in the hopper and dropping down into and through the arm, for the purpose set forth.

2. A main chute having an arm provided with a hopper; in combination with a ball for closing the mouth of the hopper and a chain located within the arm and secured to the ball for the purpose set forth.

3. A main chute having an arm provided with a hopper; in combination with a ball in the mouth of said hopper, a chain for operating said ball and a second chain secured to the ball and located within the arm and a third chain in the main hopper connected with the chain in the arm, for the purpose explained.

4. A main chute having an arm provided with a hopper and a ball which fits into said hopper and closes the same and a door below the arm in the main chute; in combination with a chain which connects the door in the main chute with the ball, the length of the chain being such that the door remains normally open and is closed as the ball is raised, for the purpose set forth.

5. In an ash chute of the character described, the combination of a main chute and an arm provided with an opening or inlet for the ashes and an opening in the main ash chute below the arm, with devices for closing both the opening in the arm and the one below in the chute, the two closing devices connected by an operating cable and adapted to close the door in the chute simultaneously with the opening of the device in the arm, substantially as described.

6. In an ash chute of the character described, the combination of the main chute and an arm provided with an opening or inlet for the ashes, and an opening in the main chute below the arm with devices for closing both the opening in the arm and the one below in the chute, the two closing devices connected by an operating cable located within the main chute and the arm and adapted to close the door in the chute simultaneously with the opening of the device in the arm, substantially as described.

ROBT. C. WHAYNE.

Witnesses:
J. T. GATHRIGHT,
THOS. E. WILSON.